United States Patent
Abe

(10) Patent No.: US 9,036,922 B2
(45) Date of Patent: May 19, 2015

(54) IMAGE CLASSIFICATION PROGRAM, IMAGE CLASSIFICATION DEVICE, AND ELECTRONIC CAMERA

(75) Inventor: Hiroyuki Abe, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 522 days.

(21) Appl. No.: 12/310,917

(22) PCT Filed: Oct. 1, 2007

(86) PCT No.: PCT/JP2007/069191
§ 371 (c)(1),
(2), (4) Date: Mar. 12, 2009

(87) PCT Pub. No.: WO2008/044524
PCT Pub. Date: Apr. 17, 2008

(65) Prior Publication Data
US 2010/0080420 A1    Apr. 1, 2010

(30) Foreign Application Priority Data

Oct. 10, 2006  (JP) ................. 2006-276190

(51) Int. Cl.
| | | |
|---|---|---|
| *G06K 9/62* | (2006.01) | |
| *G06K 9/00* | (2006.01) | |
| *G06F 17/30* | (2006.01) | |
| *G11B 27/28* | (2006.01) | |
| *H04N 5/232* | (2006.01) | |
| *H04N 5/77* | (2006.01) | |
| *H04N 5/91* | (2006.01) | |
| *H04N 9/82* | (2006.01) | |

(52) U.S. Cl.
CPC ........ *G06F 17/30256* (2013.01); *G06K 9/6223* (2013.01); *G11B 27/28* (2013.01); *H04N 5/232* (2013.01); *H04N 5/772* (2013.01); *H04N 5/91* (2013.01); *H04N 9/8205* (2013.01)

(58) Field of Classification Search
USPC .......................................... 382/106, 224, 255
See application file for complete search history.

(56) References Cited

U.S. PATENT DOCUMENTS 5,751,850 A * 5/1998 Rindtorff ...................... 382/178

FOREIGN PATENT DOCUMENTS

| JP | A-08-055220 | 2/1996 |
| JP | A-H09-312794 | 12/1997 |
| JP | A-H11-25263 | 1/1999 |
| JP | A-11-134344 | 5/1999 |
| JP | A-2001-160057 | 6/2001 |
| JP | A-2002-117403 | 4/2002 |
| JP | A-2002-304415 | 10/2002 |
| JP | A-2003-087545 | 3/2003 |

(Continued)

OTHER PUBLICATIONS

Jan. 24, 2012 Office Action issued in Japanese Application No. 2008-538656 (with translation).

(Continued)

*Primary Examiner* — John Strege
(74) *Attorney, Agent, or Firm* — Oliff PLC

(57) ABSTRACT

An image classification program that is executed by a computer includes a first processing step of calculating feature values on the basis of the pixel densities of images, a second processing step of performing calculating in a space defined by the feature values, and a third processing step of grouping images that correspond to feature values that have been divided by the clustering.

5 Claims, 10 Drawing Sheets

(56) References Cited

FOREIGN PATENT DOCUMENTS

| JP | A-2004-341940 | 12/2004 |
| JP | A-2005-235041 | 9/2005 |
| JP | A-2005-327242 | 11/2005 |
| JP | A-2006-079567 | 3/2006 |
| JP | A-2006-190154 | 7/2006 |
| JP | A-2006-191467 | 7/2006 |

OTHER PUBLICATIONS

Feb. 5, 2013 Office Action issued in Japanese Patent Application No. 2012-099065 w/translation.
Apr. 23, 2013 Office Action issued in Japanese Patent Application No. 2012-099065 w/translation.
Apr. 30, 2014 Office Action issued in Japanese Patent Application No. 2013-151583 (with English Translation).

* cited by examiner

IMAGE CLASSIFICATION PROGRAM, IMAGE CLASSIFICATION DEVICE, AND ELECTRONIC CAMERA

TECHNICAL FIELD

The present invention relates to an image classification program, to an image classification device, and to an electronic camera.

BACKGROUND ART

A technique for classifying images is per se known (refer to Patent Document #1).
Patent Document #1: Japanese Laid-Open Patent Publication Heisei 11-134344.

DISCLOSURE OF THE INVENTION

Problems to be Solved by the Invention

With this prior art technique, it has been necessary to perform a search in advance by human intervention for images that are similar, and to mark the images that have been found.

Means for Solving the Problems

According to a first aspect of the present invention, an image classification program that is executed by a computer comprises: a first processing step of calculating feature values on the basis of the pixel densities of images; a second processing step of performing clustering in a space defined by the feature values; and a third processing step of grouping images that correspond to feature values that have been divided by the clustering.

According to a second aspect of the present invention, with the image classification program according to the first aspect, it is also possible to calculate feature values on the basis of the pixel densities of the entire image in the first processing step.

According to a third aspect of the present invention, with the image classification program according to the first aspect or the second aspect, it is also possible to calculate a plurality of feature values on the basis of the pixel densities of different regions into which the image is divided in the first processing step.

According to a fourth aspect of the present invention, with the image classification program according to the third aspect, it is also possible to calculate ratios of the plurality among feature values that have been calculated on the basis of the pixel densities of different regions as new feature values in the first processing step.

According to a fifth aspect of the present invention, an image classification program that is executed by a computer comprises: a first processing step of calculating feature values on the basis of distance range-finding information during image photography; a second processing step of performing clustering in a space defined by the feature values; and a third processing step of grouping images that correspond to feature values that have been divided by the clustering.

According to a sixth aspect of the present invention, with the image classification program according to the fifth aspect, it is also possible to calculate a plurality of feature values on the basis of distance range-finding information on different regions into which the image has been divided.

According to a seventh aspect of the present invention, an image classification program that is executed by a computer comprises: a first processing step of calculating first feature values on the basis of the pixel densities of images; a second processing step of calculating second feature values on the basis of distance range-finding information during image photography; a third processing step of performing clustering in a space defined by the first feature values and the second feature values; and a fourth processing step of grouping images that correspond to feature values that have been divided by the clustering.

According to an eighth aspect of the present invention, an image classification program that is executed by a computer comprises: a first processing step of calculating feature values on the basis of distance range-finding information on main photographic subjects during image photography; a second processing step of performing clustering in a space defined by the feature values; and a third processing step of grouping images that correspond to feature values that have been divided by the clustering.

According to a ninth aspect of the present invention, an image classification program that is executed by a computer comprises: a first processing step of calculating feature values on the basis of distance range-finding information on backgrounds during image photography; a second processing step of performing clustering in a space defined by the feature values; and a third processing step of grouping images that correspond to feature values that have been divided by the clustering.

According to a tenth aspect of the present invention, an image classification program that is executed by a computer comprises: a first processing step of calculating feature values on the basis of the amounts of change regarding distance range-finding information on main photographic subjects during image photography; a second processing step of performing clustering in a space defined by the feature values; and a third processing step of grouping images that correspond to feature values that have been divided by the clustering.

According to an eleventh aspect of the present invention, an image classification program that is executed by a computer comprises: a first processing step of calculating feature values on the basis of the amounts of change regarding pixel densities for main photographic subjects during image photography; a second processing step of performing clustering in a space defined by the feature values; and a third processing step of grouping images that correspond to feature values that have been divided by the clustering.

According to a twelfth aspect of the present invention, an image classification program that is executed by a computer comprises: a first processing step of calculating feature values respectively on the basis of at least two of the pixel densities of images, distance range-finding information during image photography, distance range-finding information on main photographic subjects during image photography, distance range-finding information on backgrounds during image photography, the amounts of change regarding distance range-finding information on the main photographic subjects during image photography, and the amounts of change regarding pixel densities for the main photographic subjects during image photography; a second processing step of performing clustering in a space defined by the feature values; and a third processing step of grouping images that correspond to feature values that have been divided by the clustering.

According to a thirteenth aspect of the present invention, an image classification device is equipped with an image classification program according to any one of the first through the twelfth aspects.

According to a fourteenth aspect of the present invention, an electronic camera is equipped with an image classification program according to any one of the first through the twelfth aspects.

Advantageous Effect of the Invention

According to the present invention, it is possible to classify images without human intervention.

BEST MODES FOR CARRYING OUT THE INVENTION

Embodiment One

Figure 1:
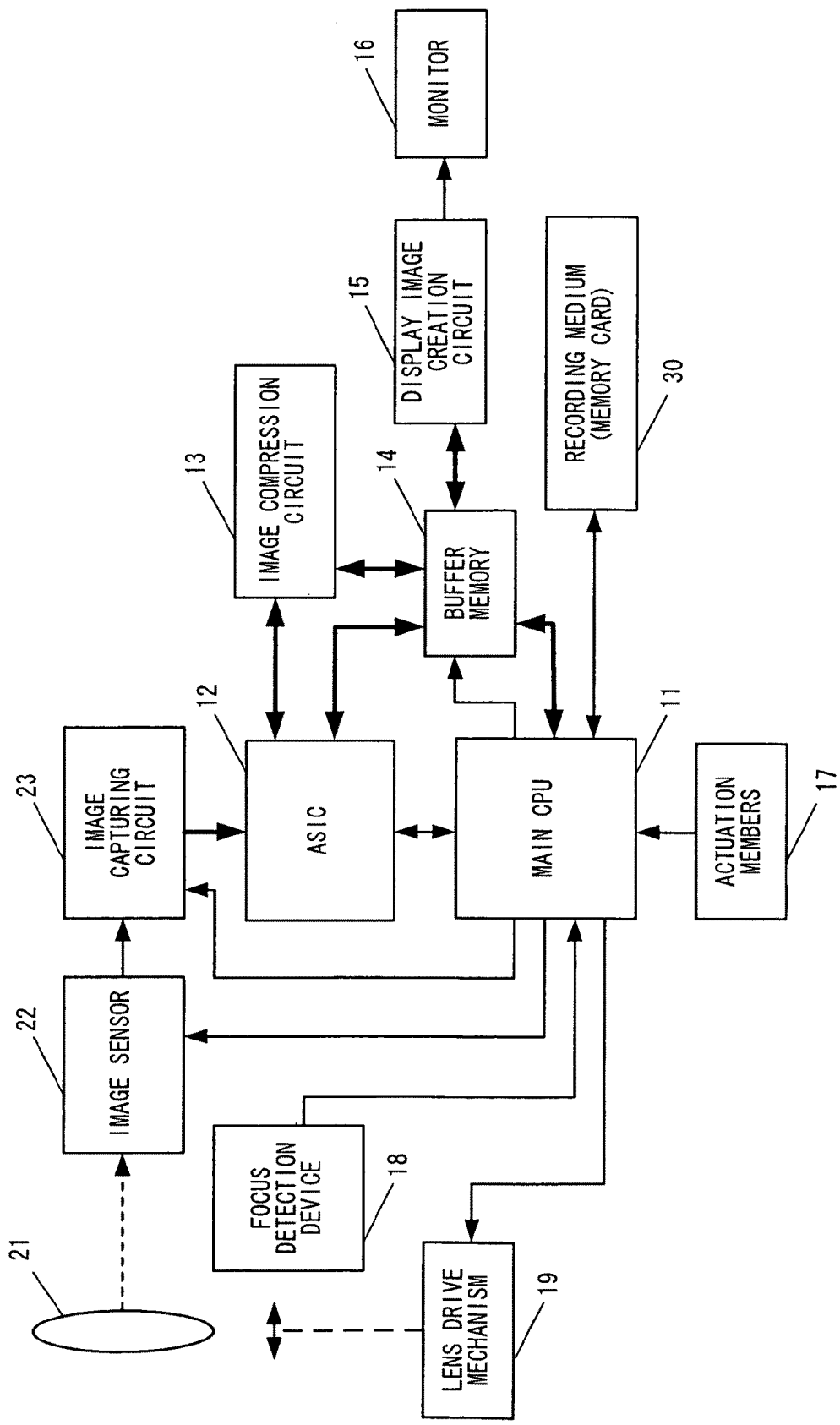
FIG. 1 is a block diagram for explanation of the structure of the principal portions of an electronic camera according to an embodiment of the present invention.

In the following, preferred embodiments for implementation of the present invention will be explained. FIG. 1 is a block diagram for explanation of the structure of the principal portions of an electronic camera 1 according to a first embodiment of the present invention. This electronic camera 1 is controlled by a main CPU 11.

A photographic lens 21 forms an image of a photographic subject upon the photographic surface of an image sensor 22. This image sensor 22 consists of a CCD image sensor or the like, and captures an image of the photographic subject formed upon its photographic surface and outputs an image capture signal to an image capturing circuit 23. Various R (red), G (green), and B (blue) color filters are provided upon the photographic surface of the image sensor 22, corresponding to the positions of its pixels. Since the image sensor 22 captures the image of the photographic subject through these color filters, the photoelectric conversion signal output from the image sensor 22 contains color information in the RGB color system.

After having performed analog processing (gain control or the like) upon the photoelectric conversion signal output from the image sensor 22, the image capturing circuit 23 converts this analog image capture signal into digital data with an internally provided A/D conversion circuit.

The main CPU 11 inputs signals output from the various blocks and performs predetermined calculations, and outputs control signals to the various blocks based upon the results of these calculations. An image processing circuit 12 may consist of, for example, an ASIC, and performs image processing upon the digital image signal input from the image capturing circuit 23. This image processing may, for example, include color accentuation processing, color temperature adjustment processing (white balance adjustment), and format conversion processing upon the image signal.

An image compression circuit 13 performs image compression processing at a predetermined compression ratio according to the JPEG method upon the image signal after it has been processed by the image processing circuit 12. A display image creation circuit 15 creates display data for displaying a captured image upon a liquid crystal monitor 16.

A recording medium 30 consists of a memory card or the like that can be fitted to the electronic camera 1 or removed therefrom. According to commands from the main CPU 11, image files that include photographic image data and information relating thereto are recorded upon this recording medium 30. Image files that are recorded upon the recording medium 30 can be read out according to commands from the main CPU 11.

A buffer memory 14 is used for temporarily storing data before and after image processing and data that is being image processed, and is also used for storing image files before they are recorded upon the recording medium 30 and for storing image files that have been read out from the recording medium 30.

Actuation members 17 of the electronic camera 1 include buttons and switches of various types, and output actuation signals to the main CPU 11 according to the details of actuation of these various actuation members, such as depression actuation of a release button and changeover actuation of a mode changeover switch and so on.

A focus detection device 18 performs detection of the focus adjustment state of the photographic lens 21 by a per se well known phase difference detection method, using a ray bundle that corresponds to a focus detection region. In concrete terms, a pair of images of the photographic subject are imaged upon an auto focus sensor (not shown in the figures) via a focus detection optical system (also not shown in the figures). The main CPU 11 calculates the adjustment state (the defocus amount) at the focal point position of the photographic lens 21, on the basis of the relative gap between this pair of images of the photographic subject upon the sensor.

According to commands from the main CPU 11, a lens drive mechanism 19 drives a focus lens (not shown in the figures) that is included in the photographic lens 21 forwards and backwards along the direction of the optical axis. Due to this, focus adjustment is performed.

This electronic camera is configured to being able to be changed over between a photography mode and a replay mode. The photography mode is an operational mode in which an image of the photographic subject is photographed, and the data for this photographic image is stored as an image file upon the recording medium 30. The replay mode is an operational mode in which image data that has been photographed is read out from the recording medium 30 or the like, and a replay image based upon this image data is displayed upon the liquid crystal monitor 16.

Photographic Image Classification Processing

The electronic camera 1 of this embodiment has a function of automatically classifying photographic images. In concrete terms, classification processing is performed upon the image files that have been recorded upon the recording medium 30, and the image files after having been classified are stored in folders one of which is provided for each group.

The main CPU 11 of the electronic camera 1 starts this image classification processing when an actuation signal that commands execution of classification processing is input from an actuation member 17.

Figure 2:
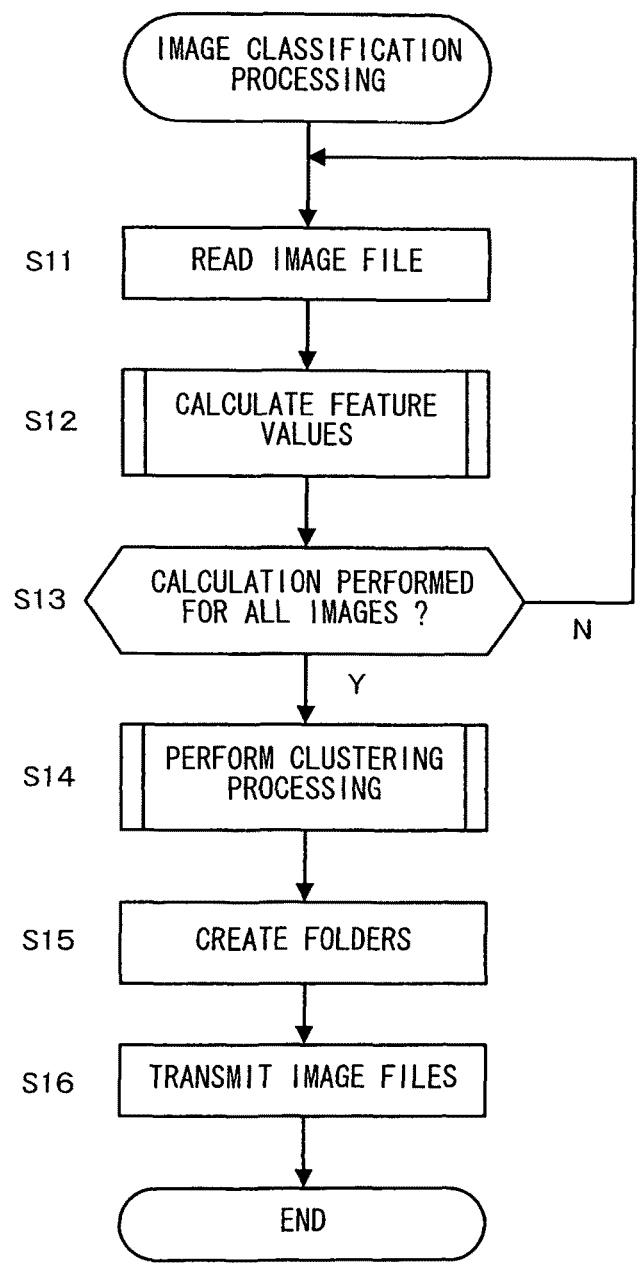
FIG. 2 is a flow chart for explanation of the flow of image classification processing.

FIG. 2 is a flow chart for explanation of the flow of this image classification processing that is performed by the main CPU 11. In a step S11 of FIG. 2, the main CPU 11 reads out an image file from the recording medium 30, and stores the image data in this file in the buffer memory 14, and then the flow of control proceeds to a step S12. As the method for this reading out of the image files, it is arranged for it to be possible to select either a method of reading them out in order from some folder that is commanded in advance, or a method of reading them out from all the folders upon the recording medium 30, according to an actuation signal from an actuation member 17.

In the step S12, the main CPU 11 calculates feature values for the image data in the buffer memory 14, and then the flow of control proceeds to a step S13. The details of this feature values calculation processing will be described hereinafter. In the step S13, the main CPU 11 makes a decision as to whether or not feature values have been calculated for all of the images. If this reading out and this calculation of feature values have been performed for all of the image files for which the reading out has been commanded, the main CPU 11 makes an affirmative decision in this step S13, and the flow of control proceeds to a step S14. On the other hand, if some image files still are present for which this reading out and this calculation of feature values have not yet been performed, the main CPU 11 makes a negative decision in this step S13, and the flow of control returns to the step S11. If the flow of control has returned to the step S11, the reading out of an image file and the calculation processing for its feature values are repeated.

In the step S14, the main CPU 11 performs clustering processing, and then the flow of control proceeds to a step S15. The details of this clustering processing will be described hereinafter. In the step S15, the main CPU 11 creates a plurality of folders corresponding to the number of clusters after clustering processing in a predetermined region upon the recording medium 30, and then the flow of control proceeds to a step S16. In this step S16, the main CPU 11 transmits the image files into the folders that correspond to each cluster. In concrete terms, the CPU 11 transmits each image file that corresponds to feature data included within each cluster into a folder that corresponds thereto, and then the processing shown in FIG. 2 terminates. By this processing, a plurality of image files upon the recording medium 30 are classified, and they are transmitted into folders that have been created.

The details of the characteristic values calculation processing will now be explained with reference to the flow chart that is shown by way of example in FIG. 3. In a step S31 of FIG. 3, the main CPU 11 calculates the ratio between the B component Bh of the upper portion of the image and the B component Bt of the lower portion of the image (i.e. calculates the ratio=Bh/Bt) and then the flow of control proceeds to a step S32. Bh is the average of the density values (that in the case of 8-bit tones are, for example, from 0 to 255) of the B components of the pixel data corresponding to, for example, the region of approximately ⅓ of the image from the top down among the pixel data that make up the image. And Bt is the average of the density values of the B components of the pixel data corresponding to, for example, the region of approximately ⅓ of the image from the bottom up among the pixel data that make up the image.

In the step S32, the main CPU 11 calculates edge information E, and then the flow of control proceeds to a step S33. This edge information E is information that is obtained by calculating the differences between the data of adjacent pixels among the pixel data that makes up the image after having performed filter processing in the G component for edge extraction. In concrete terms, edge extraction is performed using so called Sobel operator coefficient matrices (the following Equations (1) and (2)) upon the G component image in units of pixels:

Equation 1
Equation 1

$$\begin{pmatrix} -1 & 0 & 1 \\ -2 & 0 & 2 \\ -1 & 0 & 1 \end{pmatrix} \quad (1)$$

SOBEL (X DIRECTION)

Equation 2
Equation 2

$$\begin{pmatrix} -1 & -2 & -1 \\ 0 & 0 & 0 \\ 1 & 2 & 1 \end{pmatrix} \quad (2)$$

SOBEL (Y DIRECTION)

The above Equation (1) is an operator for the X direction of pixel arrangement, while the above Equation (2) is an operator for the Y direction of pixel arrangement. Furthermore, the absolute values of the density differences (the differences of the density values) between adjacent pixels are calculated for the image after edge extraction with the operators described above, and the sum total of these absolute values constitutes the edge information E.

In the step S33, the main CPU 11 calculates the average density Bm of the B component, and then the flow of control proceeds to a step S34. The main CPU 11 calculates the average of the density values (that in the case of 8-bit tones are, for example, from 0 to 255) of the B components in all of the pixel data that makes up the image.

In the step S34, the main CPU 11 calculates the average density Ym of the Y component, and then the flow of control proceeds to a step S35. The Y component is luminance information that is calculated according to the following Equation (3). The main CPU 11 calculates the average of the density values of the Y components in all of the pixel data that makes up the image.

$$Y = 0.299 \times R + 0.587 \times G + 0.114 \times B \quad (3)$$

Figure 4:
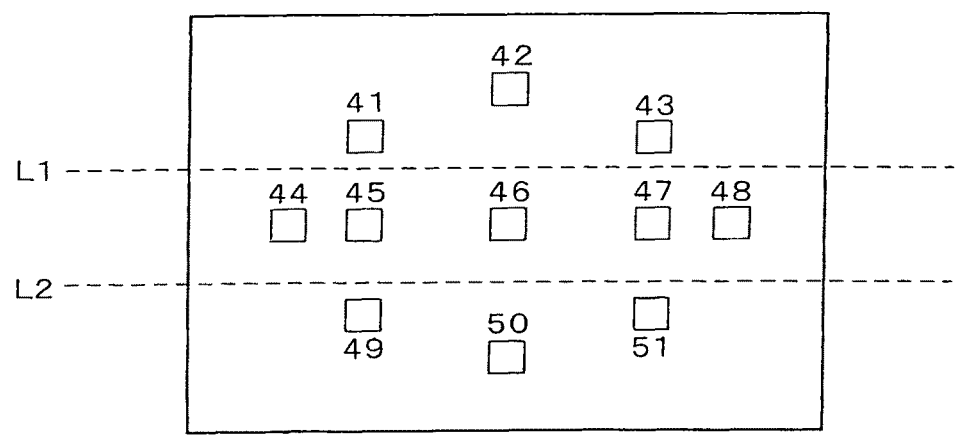
FIG. 4 is a figure for explanation of a focus detection region of an electronic camera according to the first embodiment.

In the step S35, the main CPU 11 calculates distance information for the upper portion of the image. FIG. 4 is a figure for explanation of the focus detection region of this electronic camera 1. In FIG. 4, the marks (the square outlines) at the eleven spots designated by the reference symbols 41 through 51 correspond to focus detection regions (focus areas). The electronic camera 1 is configured to being able to detect the defocus amounts at this plurality of spots within the photographic screen by using ray bundles that correspond to each of these focus areas.

In an image file that has been photographed by this electronic camera 1 and has been recorded upon the recording medium 30, there is recorded, for example as Exif information, distance range-finding information that includes data specifying the defocus amounts that have been detected at each of this plurality of spots described above within the photographic screen, and data specifying the focus area that was employed for focus adjustment Using distance range finding information that has been acquired in relation to the focus areas that are included in the region of, for example, approximately ⅓ of the photographic screen from above (i.e. above the straight line L1 in FIG. 4) among the distance range-finding information recorded in the image file, the main CPU 11 calculates distance information in the following manner, and then the flow of control proceeds to a step S36.

The main CPU 11 sets the distance information to "0" if, for example, the photographic subject distance is manifested less than or equal to 0.5 m according to the defocus amount. It sets the distance information to "0.3" if the photographic subject distance is manifested between 0.5 m and 2 m according to the defocus amount. If the photographic subject distance is manifested between 2 m and 5 m according to the defocus amount, it sets the distance information to "0.7". If the photographic subject distance is manifested greater than or equal to 5 m according to the defocus amount, it sets the distance information to be "1".

(1) if a focus area exists that has been employed for focus adjustment in the region of approximately ⅓ of the photographic screen from above, the main CPU 11 takes the distance information specified by the defocus amount for which focus area as the distance information Dh for the upper portion of the image. (2) if no focus area exists that has been employed for focus adjustment in that region of approximately ⅓ of the photographic screen from above, the main CPU 11 takes the average of the distance information specified by the defocus amounts for the plurality of focus areas included in that region as the distance information Dh for the upper portion of the image.

In the step S36, using distance range finding information that has been acquired in relation to the focus areas that are included in the region of, for example, approximately ⅓ of the photographic screen centered upon its middle from above and below (i.e. between the straight lines L1 and L2 in FIG. 4) among the distance range-finding information recorded in the image file, the main CPU 11 calculates distance information in the following manner, and then the flow of control proceeds to a step S37.

(1) if a focus area exists that has been employed for focus adjustment in the region of approximately ⅓ of the photographic screen in the middle thereof, the main CPU 11 takes the distance information specified by the defocus amount for that focus area as the distance information Dc for the central portion of the image. (2) if no focus area exists that has been employed for focus adjustment in that region of approximately ⅓ of the photographic screen in the middle thereof, the main CPU 11 takes the average of the distance information specified by the defocus amounts for the plurality of focus areas included in that region as the distance information Dc for the central portion of the image.

In the step S37, using distance range finding information that has been acquired in relation to the focus areas that are included in the region of, for example, approximately ⅓ of the photographic screen from below (i.e. below the straight line L2 in FIG. 4) among the distance range-finding information recorded in the image file, the main CPU 11 calculates distance information in the following manner, and then the processing of FIG. 3 terminates and the flow of control is transferred to a step S13 of FIG. 2.

(1) if a focus area exists that has been employed for focus adjustment in the region of approximately ⅓ of the photographic screen from below, the main CPU 11 takes the distance information specified by the defocus amount for that focus area as the distance information Dt for the lower portion of the image. (2) if no focus area exists that has been employed for focus adjustment in that region of approximately ⅓ of the photographic screen from below, the main CPU 11 takes the average of the distance information specified by the defocus amounts for the plurality of focus areas included in that region as the distance information Dt for the lower portion of the image. By the characteristic values calculation processing explained above, characteristic values of seven types are calculated for one image.

The details of the clustering processing will now be explained with reference to the flow chart that is shown by way of example in FIG. 5. In a step S51 of FIG. 5, the main CPU 11 takes one image (one element of data in the feature space of n dimensions defined by the feature values of n types) as one cluster, and then the flow of control proceeds to a step S52. In this embodiment, the clustering is performed in a seven dimensional space defined by the feature values of seven types Bh/Bt, E, Bm, Ym, Dh, Dc, and Dt. This seven dimensional space is a virtual space in which seven feature axes that specify these feature values are mutually orthogonal.

In the step S52, the main CPU 11 calculates the distances d (R,Q) between the clusters using the following Equation (4) for calculating the average between groups, and then the flow of control proceeds to a step S53.

Equation 3
Equation 3

$$d(R, Q) = \frac{1}{|R||Q|} \sum_{\substack{i \in R \\ j \in Q}} d(i, j) \tag{4}$$

| |-NUMBER OF ELEMENTS where each of R and Q denotes a cluster.

In the space S53, the main CPU 11 groups a pair of clusters whose distance is the minimum among the mutual distances of the clusters into a single cluster, and then the flow of control proceeds to a step S54. Due to this processing, the number of clusters decreases. In the step S54, the main CPU 11 makes a decision as to whether or not the number of clusters is a predetermined number. If the number of clusters has decreased down to the predetermined number, the main CPU 11 makes an affirmative decision in this step S54, and the processing of FIG. 5 terminates and the flow of control is transferred to the step S15 of FIG. 2. If the number of clusters has not yet decreased down to the predetermined number, the main CPU 11 makes a negative decision in this step S54, and the flow of control returns to the step S52. If the flow of control has thus returned to the step S52, the clustering processing continues to be performed.

For example, by setting the predetermined number in this embodiment to six, the clustering processing is performed until the number of clusters becomes six. As a result, the image files are classified into six groups. If a plurality of data elements are present within a cluster after the clustering processing, the resemblance between the images of the image files that correspond to these data elements is high.

Figure 6:
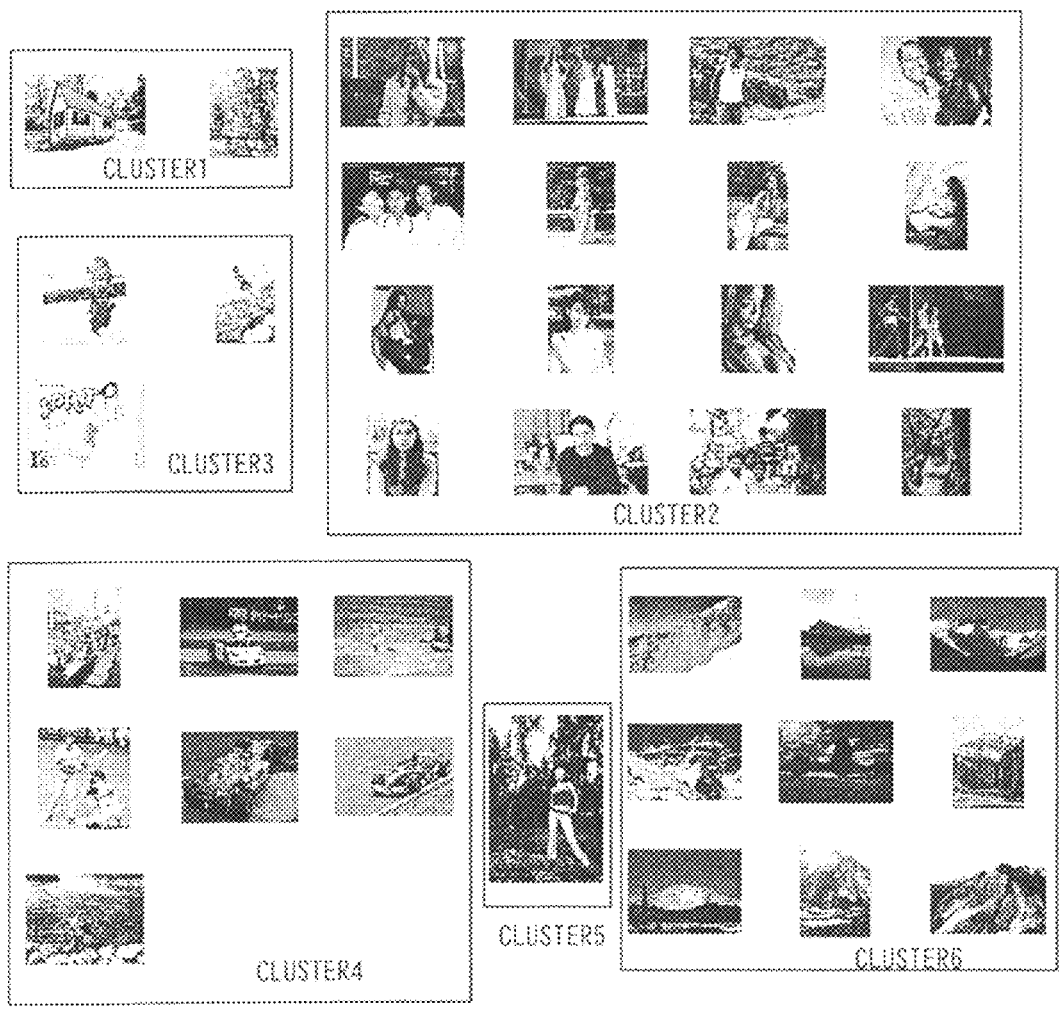
FIG. 6 is a figure for explanation of image files after classification processing, according to the first embodiment.

FIG. 6 is a figure for explanation of the image files after the classification processing. In the six folders corresponding to the six clusters after the classification processing, thumbnail images are displayed according to the image files that respectively corresponding to the clusters. According to FIG. 6, two images are included in the folder corresponding to the cluster #1, sixteen images are included in the folder corresponding to the cluster #2, three images are included in the folder corresponding to the cluster #3, seven images are included in the folder corresponding to the cluster #4, one image is included in the folder corresponding to the cluster #5, and nine images are included in the folder corresponding to the cluster #6.

In the six groups shown by way of example in FIG. 6, in particular, there is one group (cluster #2) into which portrait images are collected, one group (cluster #4) into which images of sports scenes are collected, and one group (cluster #6) into which images of mountain scenery are collected.

According to the first embodiment as explained above, the following beneficial operational advantages are obtained.

(1) It is arranged to perform per se known clustering processing as a statistical analysis technique in the feature space defined by the pixel data that makes up the images, and the feature values of the images based upon the distance range-finding information during photography. Clustering processing is a method of subdividing a set of data that is to be the subject of classification into a plurality of subsets, and by dividing the set of feature values data expressed by the images into a plurality of subsets, sets of data for images that have feature values whose degree of resemblance is high (i.e. the clusters after the cluster processing has been completed) are obtained. Since groups of images are obtained corresponding to the feature values data within the clusters whose degree of resemblance is high, it is possible to perform image classification fully automatically without benefit of human intervention.

(2) Since the clustering processing is performed in the feature space that is given by feature values (for example Bh/Bt, E, Bm, and Ym) based upon the densities expressed in the pixel data, it is possible to group together images of which the brightness or the hue is similar.

(3) Since characteristic value based upon the respective pixel densities of a plurality of regions into which the photographic scene has been divided (for example Bh and Bt) are extracted, it is possible to group together images using feature values that are present in portions of the photographic screen.

(4) Since the ratio of feature values that are extracted from a plurality of different regions are used as new feature values (for example Bh/Bt), it is possible to group together images for which the contrast between regions is similar.

(5) Since the clustering processing is performed in a space that is specified by feature values based upon the distance range-finding information during photography (for example, Dh, Dc, and Dt), it is possible to group together images for which the photographic subject distance is similar.

(6) Since feature values that are based upon distance range-finding information (for example, Dh, Dc, and Dt) are extracted from each of a plurality of regions into which the photographic screen is divided, it is possible to group together images using the distance range-finding information in portions of the photographic screen as feature values.

(7) If a subject that is focused upon is present in some region into which the photographic screen is divided up, the distance range-finding information for that subject is used as a feature value for that subdivided region, while, if no subject that is focused upon is present in some region into which the photographic screen is divided up, the average of the distance range-finding information within that subdivided region is used as a feature value for that subdivided region. Due to this, it is possible to group together close-up images in an appropriate manner, without the distance to the main photographic subject that has been focused upon being averaged.

(8) Since the image files are transmitted by file groups after the grouping process, it is simple to handle the image files after image classification. For example, when transmitting the image files after classification from the electronic camera 1 to an external device (a personal computer or an electronic photo-viewer or the like), it is possible to transmit them by folder units. Due to this, not only is the time for transmitting shortened as compared to the case of transmitting all of the image files to the external device, but also it is possible to reduce the amount of memory that is used on the side of the external device, as compared to the case of transmitting all of the image files.

Variant Embodiment One

In the above explanation, an example was explained in which a predetermined number of folders for storing the image files were created after the image classification, and the image files that had been classified were transmitted into the folders to which they corresponded. However, instead of this, it would also be acceptable to arrange to record tag information that specifies the cluster after classification in each of the image files. In this case, when transmitting the image files after classification processing from the electronic camera 1 to an external device (such as a personal computer or an electronic photo-viewer or the like), it would be possible to handle images whose mutual resemblance is high in a simple manner, by referring to the tag information in each image file, and by transmitting only image files for which the cluster is the same, to a common folder.

Variant Embodiment Two

While an example has been explained in which feature values data that was calculated using the pixel densities, and feature values data that was calculated using the distance range-finding information were both used for performing the clustering, it would also be acceptable to arrange to perform the clustering using only feature values data of one or the other of these types.

Variant Embodiment Three

The numerical values described above (for example, the number of types of feature values, the one-third regions of the image that were considered as being its upper portion, its middle portion, and its lower portion, the predetermined number in the decision of the step S54, the number of focus areas within the photographic scene, and so on) were only examples; it would be perfectly acceptable to utilize different numerical values.

Variant Embodiment Four

While an example has been explained in which image classification processing was performed upon an original image whose colors were expressed in the RGB color system (i.e. in a so called primary color system), it would also be acceptable to apply the present invention to a case in which the image classification processing was performed upon an original image whose colors are expressed in the CMY color system (i.e. in a so called complementary color system).

Embodiment Two

Figure 7:
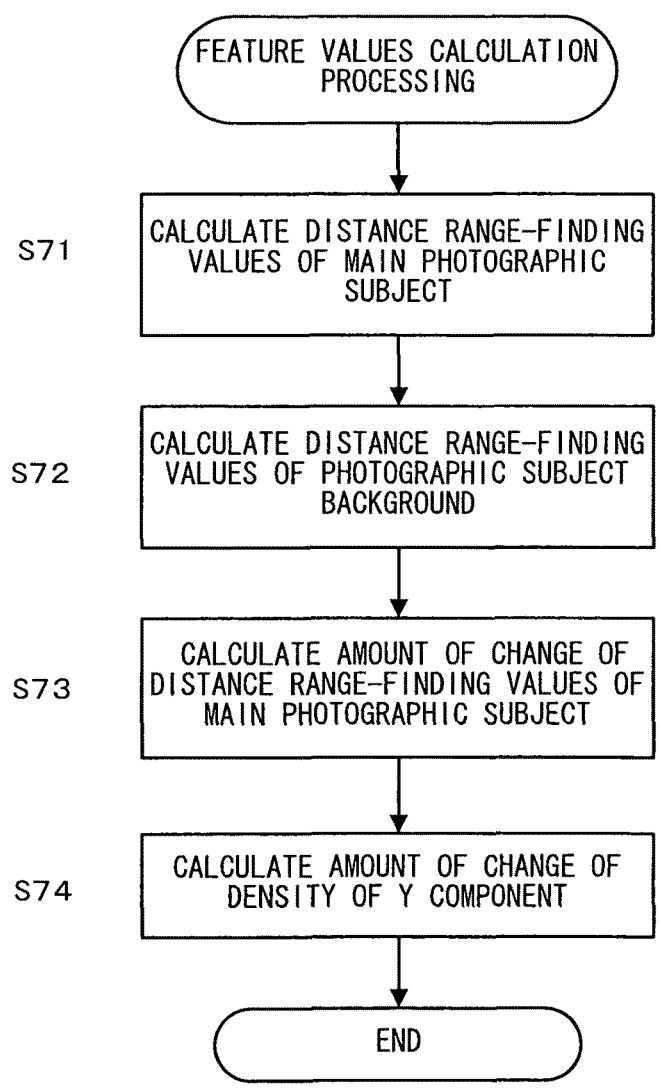
FIG. 7 is a flow chart for explanation of the flow of characteristic values calculation processing, according to a second embodiment.
Figure 8:
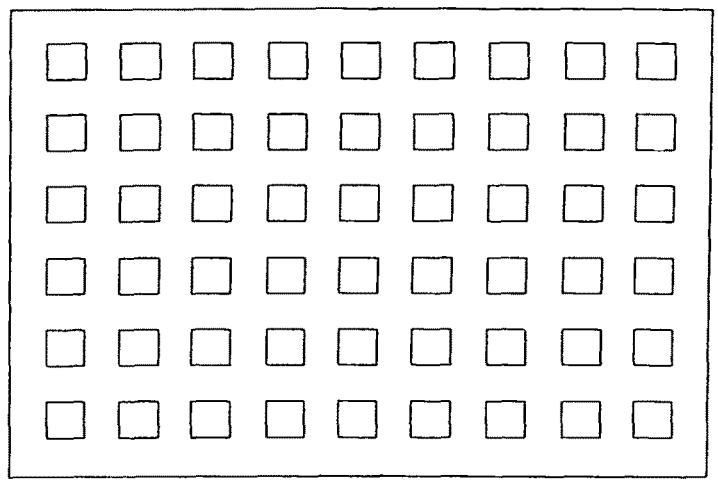
FIG. 8 is a figure for explanation of a focus detection region of an electronic camera according to the second embodiment.

It would also be acceptable to arrange to calculate feature values that are different from those of the first embodiment. FIG. 7 is a flow chart for explanation, by way of example, of the details of the flow of feature values calculation processing, according to a second embodiment of the present invention. The processing of FIG. 7 is performed instead of the processing of FIG. 3. In a step 71 of FIG. 7, the main CPU 11 calculates the distance range-finding values (i.e. the distance information) to the main photographic subject. FIG. 8 is a figure for explanation of a focus detection regions of the electronic camera 1 according to this embodiment. 54 marks (square outlines) that are arranged at 6 spots vertically×9 spots horizontally within the photographic screen corresponding to focus detection regions (focus areas). This electronic camera 1 is configured to being able to detect the defocus amounts at a plurality of spots within the photographic screen using ray bundles that correspond to the focus areas.

In the image file that has been photographed by the electronic camera and recorded upon the recording medium 30, distance range-finding information that includes data specifying the defocus amounts that were detected during auto focus (AF) adjustment at each of a plurality of spots within the above described photographic screen, and data specifying the focus area that was employed for focus adjustment, is recorded, for example, as Exif information.

Among the distance range-finding information that is recorded in the image file, the main CPU 11 calculates, for example, the photographic subject distance (the distance from the electronic camera 1 to the main photographic subject) given by the defocus amount for the focus area that was used for focus adjustment, and then the flow of control proceeds to a step S72. In this embodiment, the main CPU 11 deals with the photographic subject that is positioned within the focus area that was used for focus adjustment, as the main photographic subject.

Which focus area among the focus areas at a plurality of spots is to be used for focus adjustment, is set upon the electronic camera 1 in advance by user actuation. For example, it is possible for that focus area to be used in which the distance range-finding information indicating the closest range to the electronic camera 1 is acquired; or it is possible for a focus area that is designated by user actuation to be used. If that focus area in which the distance range-finding information indicating the closest range is acquired is to be used, the main CPU 11 deals with that photographic subject that is at the closest range to the electronic camera 1 as the main photographic subject.

In the step S72, the main CPU 11 calculates the distance range-finding value (i.e., the distance information) to the background photographic subject. The main CPU 11 calculates the photographic subject distances given by the defocus amounts that were acquired in relation to those focus areas that were not used for focus adjustment among the distance range-finding information that is recorded in the image file. Moreover, the main CPU 11 takes those distances whose differences from the above described distance to the main photographic subject are greater than a predetermined value among the photographic subject distances that have been calculated, as the distance information to the background photographic subject (i.e., the distance from the electronic camera 1 to the background); and then the flow of control proceeds to a step S73.

In this step S73, the main CPU 11 calculates the amounts of change of the distance range-finding values to the main photographic subject. The most recent amount of change information for the defocus amounts acquired in relation to the focus area that was employed for focus adjustment during AF adjustment is included in the above described Exif information in the image file that has been photographed by the electronic camera and recorded upon the recording medium 30.

When dealing with a photographic subject at close range as the main photographic subject, the main CPU 11 takes the distance range-finding information for a predetermined number of times (for example, three times) directly before photography (i.e., the close range distance range-finding information that has been acquired that number of times) from the distance range-finding information that has been acquired repeatedly before photography (for example at intervals of about 30 msec) as the amount of change information.

From the above described three items of distance range-finding information m1, m2, and m3 that are recorded in the image file, the main CPU 11 takes any one of the absolute value of the difference between m1 and m2 as speed information, the absolute value of the difference between m2 and m3 as speed information, and the absolute value of the difference between m1 and m3 as speed information, as the amount of change information for the distance range-finding values. Or, it would also be acceptable to arrange to take the absolute value of m1−(2×m2)+m3 as acceleration information, as the amount of change information for the distance range-finding values. Then the flow of control proceeds to a step S74.

In this step S74, the main CPU 11 calculates the amount of change of the density expressed by the pixel data that corresponds to the main photographic subject. The most recent amount of change information for the densities given by the pixel data acquired corresponding to the focus area employed for focus adjustment during AF adjustment is included in the above described Exif information in the image file that has been photographed by the electronic camera and recorded upon the recording medium 30.

When dealing with a photographic subject at close range as the main photographic subject, the main CPU 11 takes the density information for a predetermined number of times (for example, three times) directly before photography (i.e., the density information that has been acquired that number of times) from the pixel data that has been acquired repeatedly before photography (for example at intervals of about 30 msec) as the amount of change information.

From the above described three items of density information b1, b2, and b3 that are recorded in the image file, the main CPU 11 takes any one of the absolute value of the difference between bland b2 as speed information, the absolute value of the difference between b2 and b3 as speed information, and the absolute value of the difference between b1 and b3 as speed information, as the amount of change information for the density values. Or, it would also be acceptable to arrange to take the absolute value of b1−(2×b2)+b3 as acceleration information, as the amount of change information for the density values. Then the processing of FIG. 7 terminates. The main CPU 11 takes the average of the density values of the Y component data group included in the focus area among the pixel data that makes up the image as the density information each time. The Y component is the luminance information calculated according to Equation (3) above, and corresponds to the brightness of the image. By the feature values calculation processing explained above, feature values of four types are calculated for one image.

The main CPU 11 of the second embodiment performs the clustering processing that is shown by way of example in FIG. 5 as described below. In a step S51 of FIG. 5, the main CPU 11 takes one image (one element of data in the feature space of n dimensions defined by the feature values of n types) as one cluster, and then the flow of control proceeds to a step S52. In this embodiment, the clustering is performed in a four dimensional space defined by the feature values of four types (i.e. the distance information to the main photographic subject, the distance information to the background photographic subject, the amount of change of the distance information to the main photographic subject, and the amount of change of the density of the Y component). This four dimensional space is a virtual space in which four feature axes that specify these feature values are mutually orthogonal.

In the step S52, the main CPU 11 calculates the distances d(R,Q) between the clusters using the above Equation (4) for calculating the average between groups, and then the flow of control proceeds to a step S53.
where each of R and Q denotes a cluster.

In the space S53, the main CPU 11 groups a pair of clusters whose distance is the minimum among the mutual distances of the clusters into a single cluster, and then the flow of control proceeds to a step S54. Due to this processing, the number of clusters decreases. In the step S54, the main CPU 11 makes a decision as to whether or not the number of clusters is a predetermined number. If the number of clusters has decreased down to the predetermined number, the main CPU 11 makes an affirmative decision in this step S54, and the processing of FIG. 5 terminates and the flow of control is transferred to the step S15 of FIG. 2. If the number of clusters has not yet decreased down to the predetermined number, the main CPU 11 makes a negative decision in this step S54, and the flow of control returns to the step S52. If the flow of control has thus returned to the step S52, the clustering processing continues to be performed.

In this second embodiment, for example, by taking the predetermined number to be seven, the clustering processing is performed until the number of clusters becomes seven. As a result, the image files are classified into seven groups. If a plurality of data elements are present within a cluster after the clustering processing, the resemblance between the images of the image files that correspond to these data elements is high.

Figure 9:
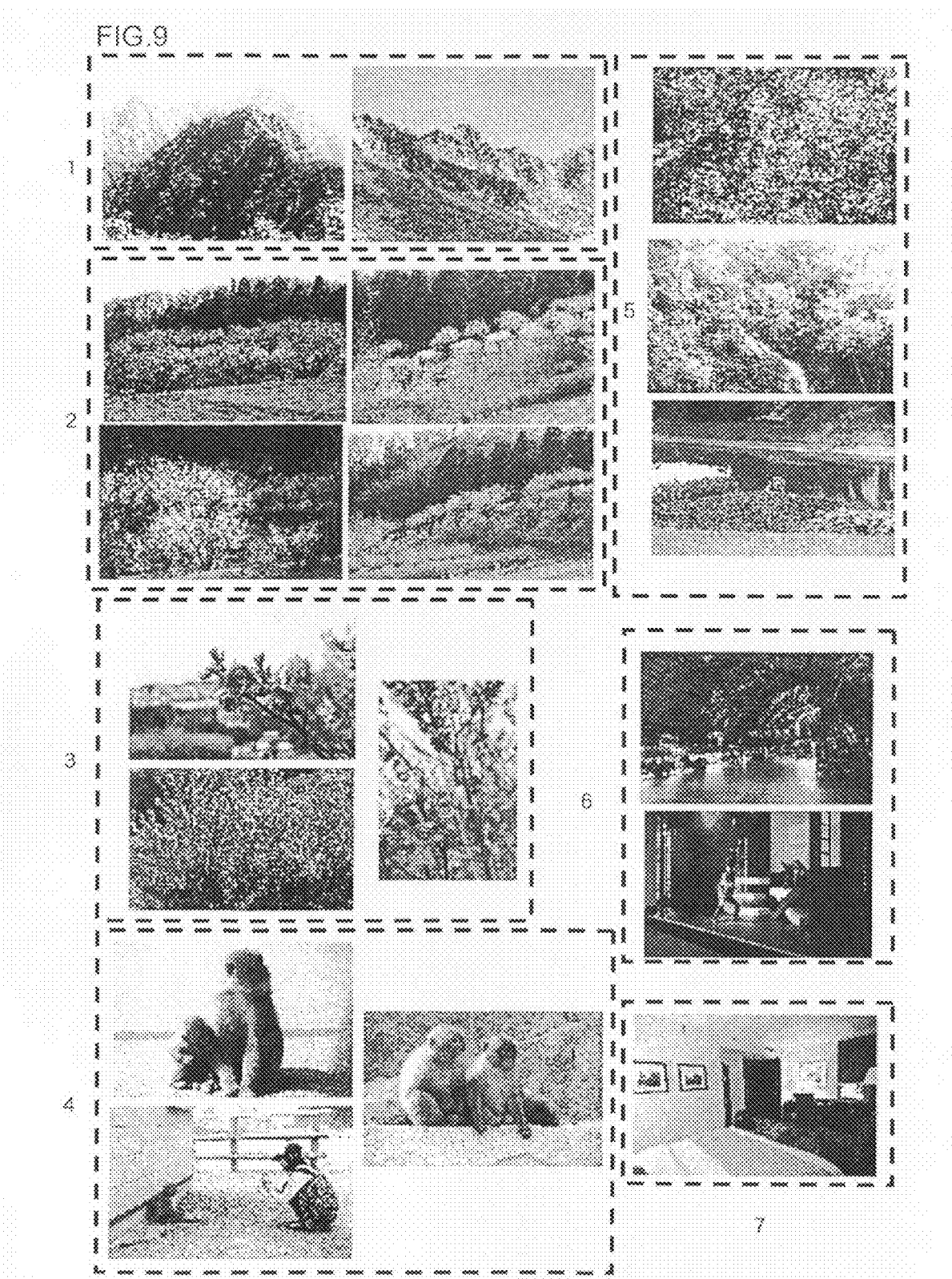
FIG. 9 is a figure for explanation of image files after classification processing, according to the second embodiment.
Figure 10:
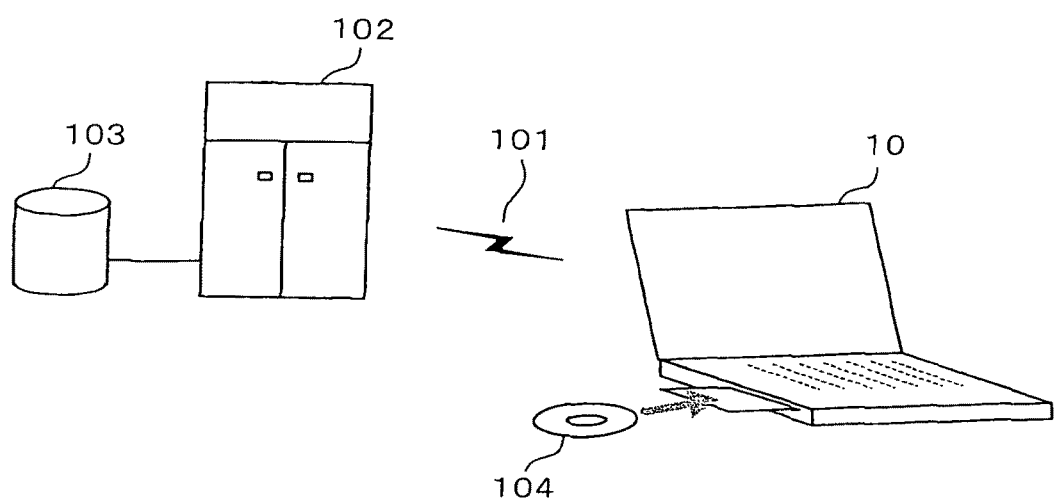
FIG. 10 is a figure showing an example of a computer device.

FIG. 9 is a figure for explanation of the image files after classification processing. In the seven folders corresponding to the seven clusters after the classification processing, thumbnail images are displayed according to the image files that respectively correspond thereto. According to FIG. 9, two images are included in the folder corresponding to the cluster #1, four images are included in the folder corresponding to the cluster #2, three images are included in the folder corresponding to the cluster #3, three images are included in the folder corresponding to the cluster #4, three images are included in the folder corresponding to the cluster #5, two images are included in the folder corresponding to the cluster #6, and one image is included in the folder corresponding to the cluster #7.

In the seven groups shown by way of example in FIG. 9, there is one group (cluster #1) into which images of mountain scenery are collected, one group (cluster #2) into which images of flower scenery are collected, one group (cluster #3) into which close-up images of flowers are collected, one group (cluster #4) into which portrait images are collected, one group (cluster #5) into which images that are closer than mountain scenery and moreover in which the green component is high are collected, one group (cluster #6) into which dark indoor images are collected, and one group (cluster #7) into which bright indoor images are collected.

According to the second embodiment as explained above, the following beneficial operational advantages are obtained.

(1) Since the clustering processing is performed in the feature space that is defined by the feature values based upon the distance information to the main photographic subject, it is possible to group together images for which the photographic distance is similar, such as, for example, close-up photography images or portrait images or the like.

(2) Since the clustering processing is performed in the feature space that is defined by the feature values based upon the distance information to the background photographic subject, it is possible to group together images for which the distance to the background is similar, such as, for example, photographs of mountains or the like.

(3) Since the clustering processing is performed in the feature space that is defined by the feature values based upon the amounts of change of the distance information to the main photographic subject, it is possible to group together images such as, for example, sports scenes or the like.

(4) Since it is arranged to obtain the amounts of change of the distance information using the focus areas in which the distance range-finding information indicating the close range is obtained, it is possible to perform the clustering processing in a feature space that takes into account, not only changes of the distance to the photographic subject, but also the amounts of change when the main photographic subject shifts within the photographic screen.

(5) Since the clustering processing is performed in a feature space that is defined by the feature values based upon the amounts of change of information relating to the density (for example, the luminance) of the main photographic subject, it is possible to group together images such as, for example, scenes in which the brightness changes or the like.

Variant Embodiment Five

While an example has been explained in which the clustering was performed using each of feature values data calculated using the distance information to the main photographic subject, feature values data calculated using the distance information to the background photographic subject, feature values data calculated using the amount of change of the distance information to the main photographic subject, and feature values data calculated using the amount of change of the density information of the main photographic subject, it would also be acceptable to perform the clustering using only feature values data of a single type. However it should be understood that, if it is arranged to perform the clustering using feature values data of a plurality of types, i.e. of at least two types, it is possible to enhance the accuracy of the grouping, since, for example, it is possible to group together images for which both the distance to the main photographic subject and also the distance to the background are similar.

Variant Embodiment Six

In addition to the feature values data of four types explained with reference to the second embodiment, it would also be acceptable to perform clustering using the feature values data of seven types explained with reference to the first embodiment. In this case as well, it would be possible to arrange to perform the clustering using feature data of at least two or more types.

Variant Embodiment Seven

In the step S74, when calculating the amount of change of the density given by the pixel data, the calculation was performed using the average of the density values of the Y component data group included in the focus area. Instead of this, it would also be acceptable to arrange to perform this calculation using the average of the density values of the data group of some specified color component (for example, of the B component). In this case, it is possible to perform grouping of images of scenery or the like by changing the tint of the specified color, since the clustering processing is performed in a feature space that is defined by the feature values based upon the amount of change of information about the density of the main photographic subject (for example the B component thereof).

Variant Embodiment Eight

Figure 3:
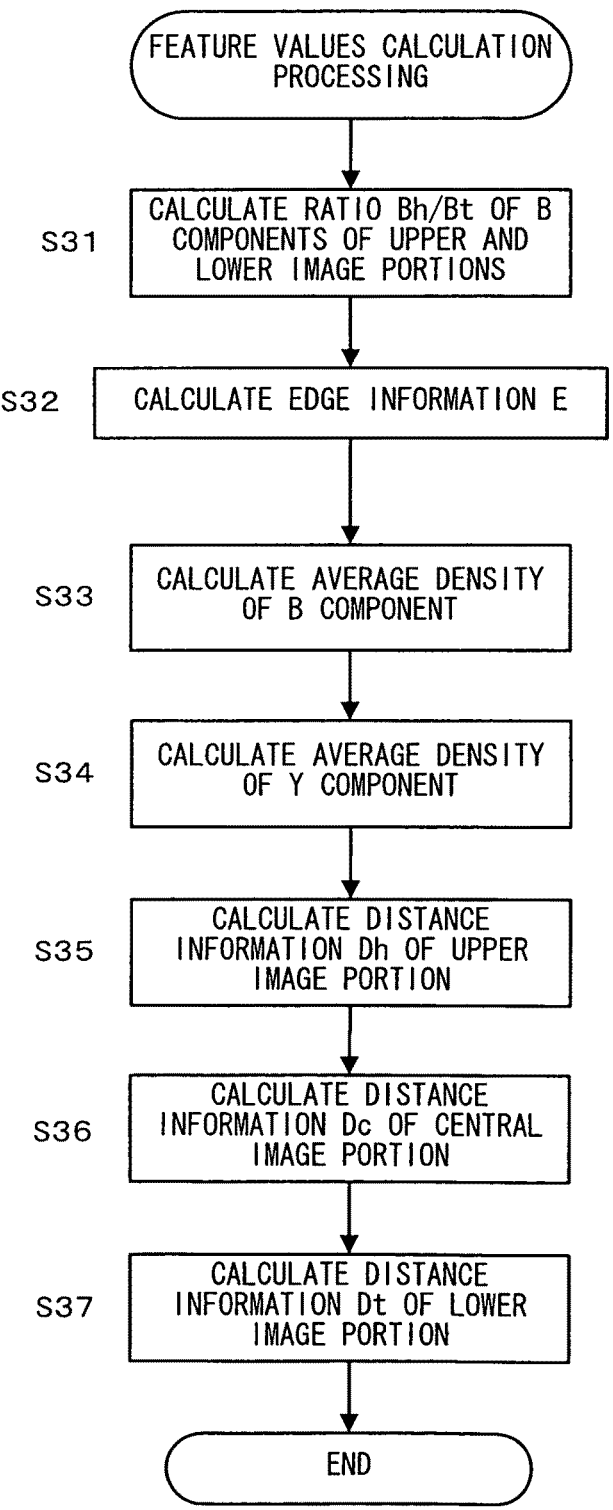
FIG. 3 is a flow chart for explanation of the flow of characteristic values calculation processing, according to the first embodiment.
Figure 5:
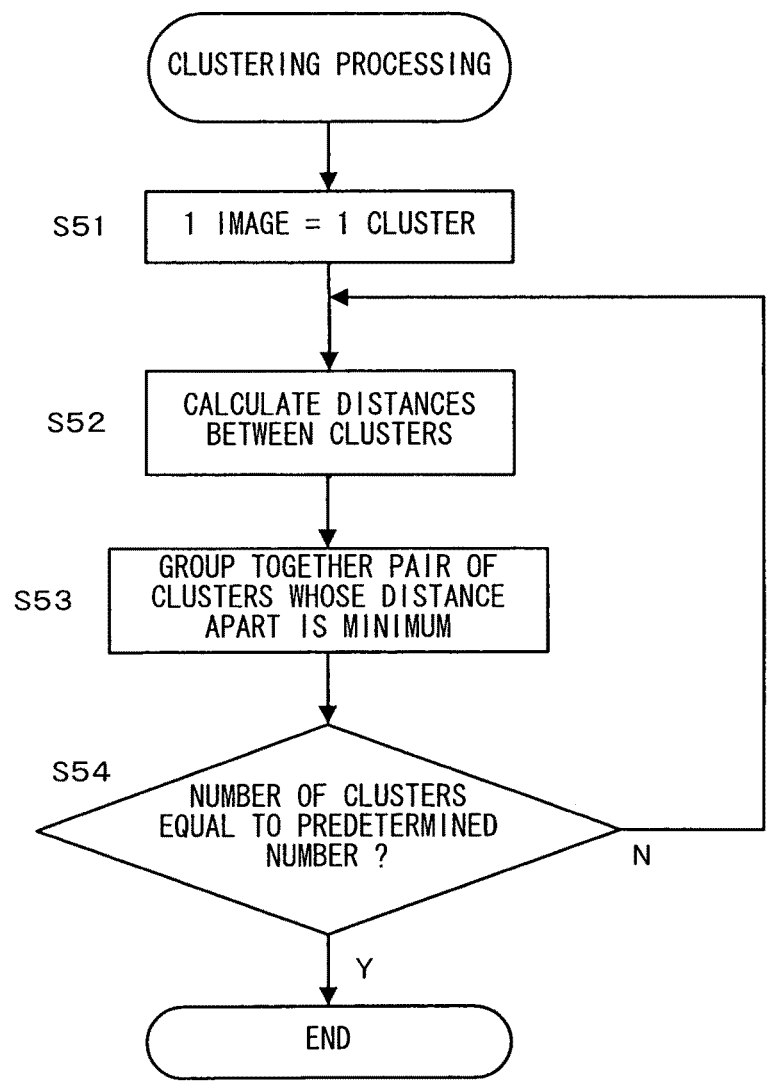
FIG. 5 is a flow chart for the explanation of the flow of clustering processing.

Although examples have been explained in which this image classification processing is performed within the electronic camera 1, it would also be acceptable to provide an image classification device by executing an image classification program that performs the processing according to FIGS. 2, 3, and 5 upon the computer device 10 shown in FIG. 7. If the image classification program is used by being loaded into the personal computer 10, then, having loaded the program into a data storage device of the personal computer 10, it may be used as an image classification device by executing that program.

For this loading of the program into the personal computer 10, it would also be acceptable to load a recording medium 104 such as a CD-ROM or the like, upon which the program is stored, into the personal computer 10; and it would also be acceptable to load the program into the personal computer 10 by the method of transmitting it via a communication circuit 101 such as a network or the like. If the program is to be loaded via the communication circuit 101, then it may be stored upon a hard disk 103 or the like of a server (a computer) 102 that is connected to the communication circuit 101. The image classification program may also be supplied as a computer program product in various different formats, such as the recording medium 104 or by supply via the communication circuit 101 or the like.

Although various embodiments and variant embodiments have been explained above, the present invention is not to be considered as being limited by the details thereof. Provided that they are considered to fall within the range of the technical concept of the present invention, other possibilities are also to be considered as being included within the scope of the present invention.

The content of the disclosure of the following patent application, upon which priority is claimed, is hereby incorporated herein by reference:
Japanese Patent Application 276, 190 of 2006 (applied on Oct. 10, 2006).

The invention claimed is:

1. A non-transitory computer readable storage medium storing a computer readable program executable by a computer for causing the computer to perform an image classification program, the image classification program comprising:
   a first processing step of dividing an image into regions by using image information for detecting a plurality of defocus amounts corresponding to a plurality of focus detection regions for focusing within the divided regions, and calculating distance information based upon (i) an existence of focus detection regions within the divided regions, and (ii) the defocus amounts for each of the focus detection regions as feature values;
   a second processing step of performing clustering in a space defined by the feature values; and
   a third processing step of grouping images that correspond to feature values that have been divided by the clustering.

2. The image classification program according to claim 1, wherein:
   in the first processing step, the divided regions include an upper portion of the image, a central portion of the image and a lower portion of the image.

3. The image classification program according to claim 2, wherein:
   in the first processing step, seven feature values are calculated, the seven features being (1) a feature value based upon a ratio between pixel density for color component of the upper portion of the image and pixel density for color component of the lower portion of the image, (2) a feature value based upon edge information that is an absolute value of differences between adjacent pixels after edge extraction has been performed on the image, (3) a feature value based upon an average density of B component in the entire image, (4) a feature value based upon an average density of Y component in the entire image, (5) the feature value based upon the distance information of the upper portion of the image, (6) the feature value based upon the distance information of the central portion of the image, and (7) the feature value based upon the distance information of the lower portion of the image.

4. An image classification device, equipped with an image classification program according to claim 1.

5. An electronic camera, equipped with an image classification program according to claim 1.

* * * * *